(12) United States Patent
Tani

(10) Patent No.: US 10,643,798 B2
(45) Date of Patent: May 5, 2020

(54) SOLID ELECTROLYTIC CAPACITOR

(71) Applicant: Murata Manufacturing Co., Ltd., Nagaokakyo-shi, Kyoto-fu (JP)

(72) Inventor: Satoshi Tani, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 15/670,496

(22) Filed: Aug. 7, 2017

(65) Prior Publication Data
US 2018/0040431 A1  Feb. 8, 2018

(30) Foreign Application Priority Data

Aug. 8, 2016 (JP) .................................. 2016-155319

(51) Int. Cl.
| | | |
|---|---|---|
| H01G 9/07 | (2006.01) | |
| H01G 9/08 | (2006.01) | |
| H01G 9/10 | (2006.01) | |
| H01G 9/15 | (2006.01) | |
| H01G 9/012 | (2006.01) | |
| H01G 9/26 | (2006.01) | |
| C01F 7/02 | (2006.01) | |

(Continued)

(52) U.S. Cl.
CPC .............. *H01G 9/15* (2013.01); *H01G 9/012* (2013.01); *H01G 9/07* (2013.01); *H01G 9/10* (2013.01); *H01G 9/26* (2013.01); *C01F 7/02* (2013.01); *C08L 83/04* (2013.01); *H01G 2009/0014* (2013.01)

(58) Field of Classification Search
CPC .. H01G 9/10; H01G 9/15; H01G 9/07; H01G 9/08

USPC ......................... 361/523, 541, 502, 535, 536
See application file for complete search history.

(56) References Cited

U.S. PATENT DOCUMENTS

| | | |
|---|---|---|
| 6,504,705 B2 | 1/2003 | Shimada et al. |
| 2002/0075633 A1 | 6/2002 | Shimada et al. |

(Continued)

FOREIGN PATENT DOCUMENTS

| | | |
|---|---|---|
| CN | 1353432 A | 6/2002 |
| JP | 2002190428 A | 7/2002 |

(Continued)

*Primary Examiner* — Arun Ramaswamy
(74) *Attorney, Agent, or Firm* — Arent Fox LLP

(57) ABSTRACT

High reliability is maintained with a suppressed increase in leakage current, and ESR is reduced. Provided are: three or more capacitor elements stacked on one another, which each include an anode part, a dielectric layer, and a cathode part including a solid electrolyte layer and a current collector layer; an insulating resin body; elastic layers in contact with, of the three or more capacitor elements, a first capacitor element located outermost at one side in the stacking direction of the three or more capacitor elements and a second capacitor element located outermost at the other side in the stacking direction thereof; a first terminal; and a second terminal. The elastic layers 170 are provided at least partially at the boundary between the insulating resin body 110 and a surface of the cathode part 160 of the first capacitor element 180a on one side as mentioned above, and at least partially at the boundary between the insulating resin body 110 and a surface of the cathode part 160 of the second capacitor element 180b on the other side as mentioned above.

16 Claims, 10 Drawing Sheets

(51) Int. Cl.
    *C08L 83/04*         (2006.01)
    *H01G 9/00*         (2006.01)

(56)                    References Cited

U.S. PATENT DOCUMENTS

| | | | |
|---|---|---|---|
| 2010/0165547 A1* | 7/2010 | Kuranuki | H01G 9/012 |
| | | | 361/525 |
| 2012/0300370 A1* | 11/2012 | Chacko | H01G 9/028 |
| | | | 361/528 |
| 2013/0120903 A1* | 5/2013 | Pan | H01G 9/048 |
| | | | 361/306.2 |

FOREIGN PATENT DOCUMENTS

| | | |
|---|---|---|
| JP | 2002198264 A | 7/2002 |
| JP | 2009-64808 A | 3/2009 |
| WO | 2006118144 A1 | 11/2006 |

\* cited by examiner

SOLID ELECTROLYTIC CAPACITOR

CROSS REFERENCE TO RELATED APPLICATIONS

The present application claims priority to Japanese Patent Application No. 2016-155319, filed Aug. 8, 2016, the entire contents of which are incorporated herein by reference.

BACKGROUND OF THE INVENTION

Field of the Invention

The present invention relates to a solid electrolytic capacitor.

Description of the Related Art

Prior art documents that disclose the configurations of solid electrolytic capacitors include Japanese Patent Application Laid-Open No. 2009-64808. The conventional solid electrolytic capacitor illustrated in FIG. 7 of Japanese Patent Application Laid-Open No. 2009-64808 has a plurality of capacitor elements stacked. The plurality of capacitor elements is coated with an exterior resin.

The plurality of capacitor elements each has an anode part and a cathode part provided by sequentially forming a dielectric layer, a solid electrolyte layer, and a current collector layer on the surface of a metallic layer that has a valve action. The anode parts of the plurality of capacitor elements are joined by resistance welding, and thus electrically connected to an anode lead frame. The cathode parts of the plurality of capacitor elements are joined with a conductive adhesive, and thus electrically connected to a cathode lead frame. The anode lead frame and the cathode lead frame are each bent along the exterior resin.

When molding a resin to the capacitor elements, compressive stress caused by the molding pressure and compressive stress caused by shrinkage through the resin reaction are applied as loads to the dielectric layer. When the dielectric layer is damaged by the load of the compressive stress, the leakage current is increased, thereby decreasing the reliability of the solid electrolytic capacitor.

In mounting the solid electrolytic capacitor onto a substrate by a reflow process with a solder, tensile stress is applied as a load between layers within the capacitor elements, due to the difference in coefficient of thermal expansion between the resin and the capacitor elements. When delamination is caused by the load or the tensile stress within the capacitor elements, the solid electrolytic capacitor has an Equivalent Series Resistance (ESR) increased.

SUMMARY OF THE INVENTION

The present invention has been achieved in view of the problems mentioned above, and an object of the invention is to provide a solid electrolytic capacitor which has high reliability with a suppressed increase in leakage current and has the ESR reduced.

A solid electrolytic capacitor in accordance with an embodiment of the invention, comprises:

(a) an insulating resin body have an outer surface;
(b) first, second and third capacitor elements located one above the other in a stacking direction in the insulating resin body such that the third capacitor element is sandwiched between the first and second capacitor elements, each of the capacitor elements comprising:

(i) a metallic anode with an outer surface provided with a number of depressions,
(ii) a dielectric layer provided on the outer surface of the metallic anode, and
(iii) a cathode comprising a solid electrolyte layer provided on at least part of an outer surface of the dielectric layer and a current collector layer provided on at least a part of an outer surface of the solid electrolyte layer;

(c) a first elastic layer in contact with the first capacitive element along at least a part of a boundary between the insulating resin body and a surface of the cathode part of the first capacitor element;
(d) a second elastic layer in contact with the second capacitive element along at least a part of a boundary between the insulating resin body and a surface of the cathode part of the second capacitor element;
(e) a first terminal electrically connected to the respective cathodes of the first, second and third capacitor elements and extending to the outer surface of the insulating resin body; and
(f) a second terminal electrically connected to the respective anodes of the first, second and third capacitor elements and extended to the outer surface of the insulating resin body.

The solid electrolytic capacitor may include a third elastic layer in contact with the third capacitive element along at least a part of a boundary between the insulating resin body and a surface of the cathode of the third capacitor element. The area of contact between the first capacitor element and the elastic layer and an area of contact between the second capacitor element and the elastic layer are preferably each larger than an area of contact between the third elastic layer and the third capacitor element.

In a preferred embodiment, the first elastic layer is provided over an entire boundary between the current collector layer of the first capacitor element and the insulating resin body; the second elastic layer is provided over an entire boundary between the current collector layer of the second capacitor element and the insulating resin body. In an alternative embodiment, the third capacitor element is not in contact with an elastic layer.

In a preferred embodiment, a first portion of the insulating resin body located between the first capacitor element and the outer surface of the insulating resin body varies in thickness as measured in the stacking direction and the first elastic layer is thicker where the thickness of the first portion of the insulating resin body is thinner and is thinner where the thickness of the first portion of the insulating resin body is thicker.

Similarly, a second, portion of the insulating resin body located between the second capacitor element and the outer surface of the insulating resin body may vary in thickness as measured in the stacking direction and the second elastic layer is thicker where the thickness of the second portion of the insulating resin body is thinner and is thinner where the thickness of the second portion of the insulating resin body is thicker.

The solid electrolytic capacitor can include at least a fourth capacitor element located between the first and second capacitor elements in the stacking direction. Like the first, second and third capacitor elements, the at least a fourth capacitor element preferably comprises:

(i) a metallic anode part having an outer surface provided with a number of depressions,
(ii) a dielectric layer provided on the outer-surface of the metallic layer, and (iii) a cathode part comprising a solid electrolyte layer provided on at least part of an outer surface of the dielectric layer and a current collector layer provided on at least a part of an outer surface of the solid electrolyte layer.

At least the first and second elastic layers preferably comprise a silicone rubber, the metallic layer preferably comprises aluminum and the dielectric layer preferably comprises an oxide of aluminum.

According to the present invention, in the solid electrolytic capacitor, the ESR can be reduced while maintaining high reliability with a suppressed increase in leakage current.

DETAILED DESCRIPTION OF THE INVENTION

A solid electrolytic capacitor according to an embodiment of the present invention will be described below with reference to the drawings. In the following explanation of the embodiment, like or corresponding parts in the figures will be denoted by like symbols, and the explanations of the parts will not be repeated.

Figure 1:
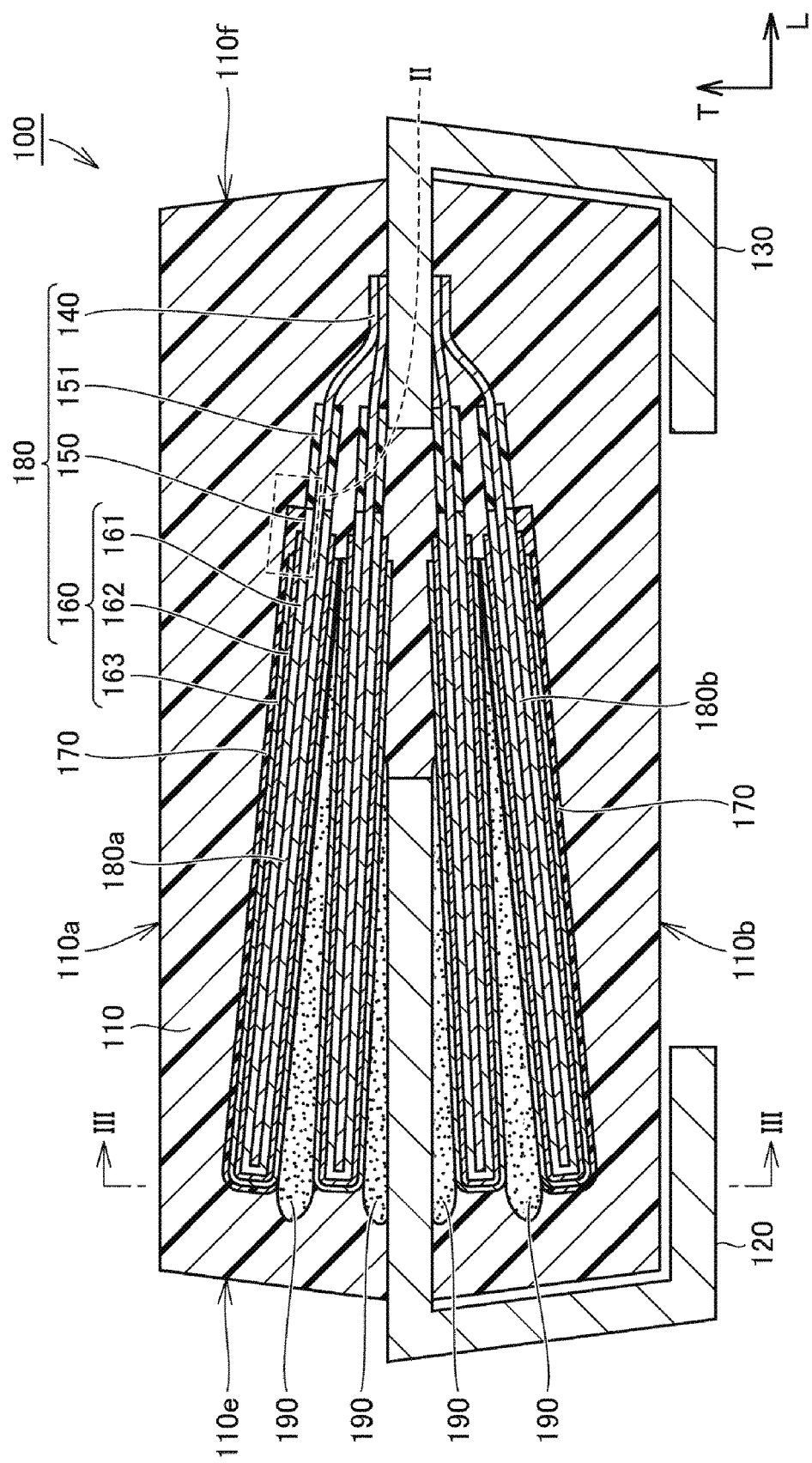
FIG. 1 is a cross-sectional view illustrating a configuration of a solid electrolytic capacitor according to an embodiment of the present invention.
Figure 3:
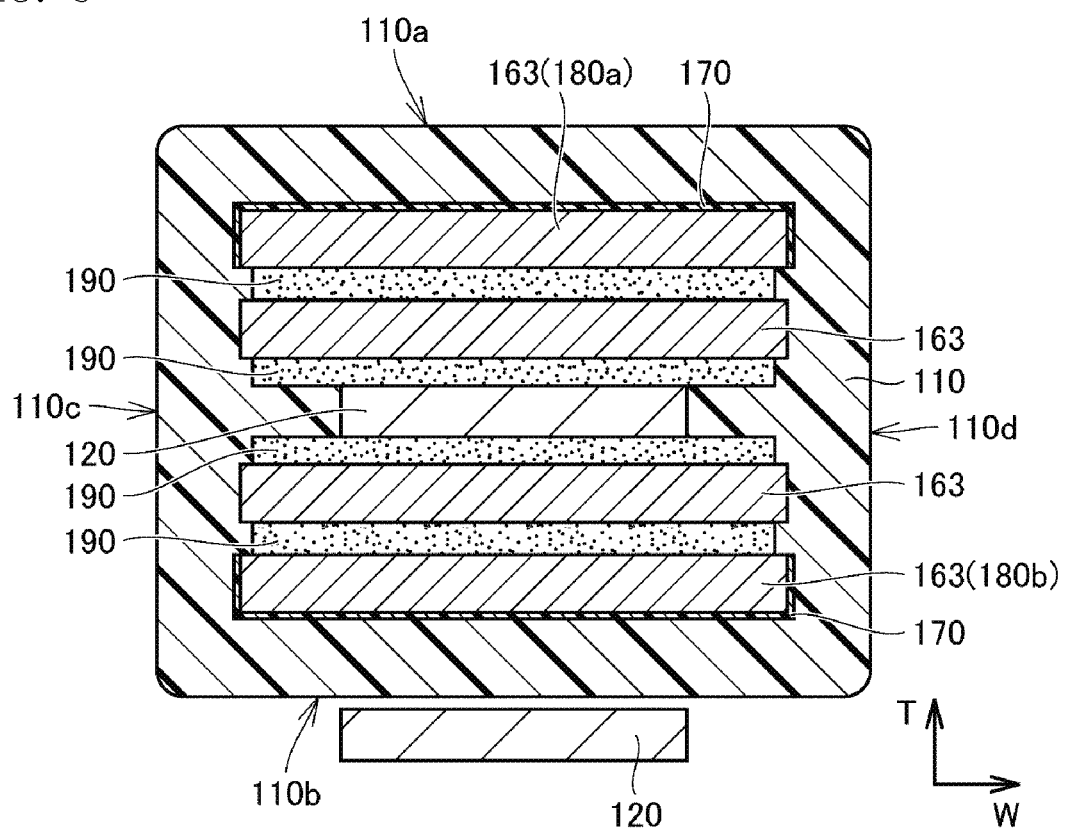
FIG. 3 is a cross-sectional view of the solid electrolytic capacitor in FIG. 1, as viewed from the direction of an arrow along line III-III.

FIGS. 1 and 3, the length direction, height direction, and width direction of an insulating resin body to be described later are respectively denoted by L, T, and W. The height direction T is perpendicular to the length direction L, and the width direction W is perpendicular to each of the length direction L and the height direction T.

Figure 2:
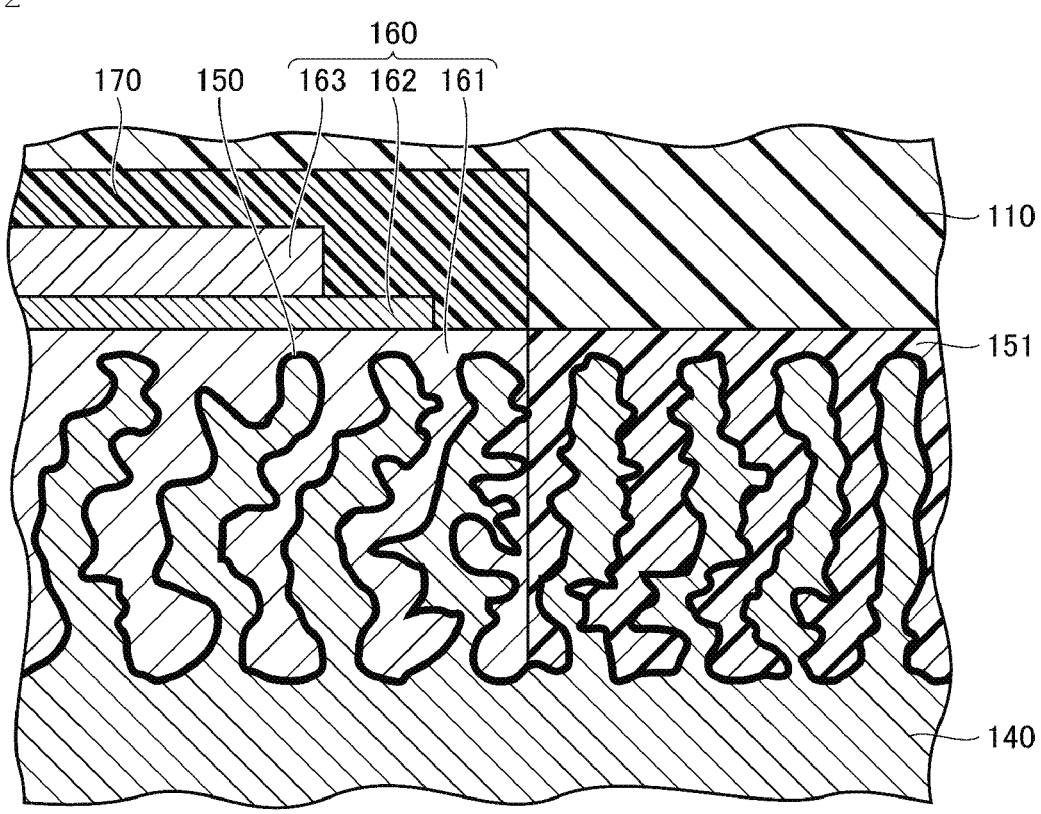
FIG. 2 is an enlarged cross-sectional view illustrating a part II of FIG. 1.

As shown in FIGS. 1 to 3, a solid electrolytic capacitor 100 according to an embodiment of the present invention has a substantially cuboid outer shape. According to the present embodiment, the external dimensions of the solid electrolytic capacitor 100 are, for example, 7.3 mm in the length direction L, 4.3 mm in the width direction W, and 1.9 mm in the height direction T.

The solid electrolytic capacitor 100 includes three or more capacitor elements 180, the insulating resin body 110, elastic layers 170, a first terminal 120, and a second terminal 130. The three or more capacitor elements 180 are provided within the insulating resin body 110 which has a substantially cuboid outer shape. The insulating resin body 110 has a first principal surface 110a and a second principal surface 110b opposite in the height direction T, a first side surface 110c and a second side surface 110d opposite in the width direction W, and a first end surface 110e and a second end surface 110f opposite in the length direction L.

As mentioned above, the insulating resin body 110 has a substantially cuboid outer shape, but may have corners and ridges rounded. The corner refers to the intersection of three surfaces of the insulating resin body 110, and the ridge refers to the intersection of two surfaces of the insulating resin body 110. At least one surface of the first principal surface 110a, the second principal surface 110b, the first side surface 110c, the second side surface 110d, the first end surface 110e, and the second end surface 110f may have unevenness formed. The insulating resin body 110 is composed of an insulating resin such as an epoxy resin, with glass or an oxide of silicon (Si) dispersively mixed as a filler.

The three or more capacitor elements 180 each include an anode (metallic layer) part 140, a dielectric layer 150, and a cathode part 160. The three or more capacitor elements 180 are stacked on one another in the height direction T.

Of the three or more capacitor elements 180, the capacitor element located closest to one side (the upper side in FIG. 1) in the stacking direction of the capacitor elements 180 is referred to as a first capacitor element 180a, whereas the capacitor element located closest to the other side (the lower side in FIG. 1) therein is referred to as a second capacitor element 180b.

The anode part is composed of a metallic layer 140. The metallic layer 140 has an outer surface provided with a number of depressions. The outer surface of the metallic layer 140 is porous. The porous outer surface of the metallic layer 140 increases the surface area of the metallic layer 140. It is to be noted that one or both of the front and back surfaces of the metallic layer 140 may be porous. For example, only the back surface of the metallic layer 140 may be porous on the side opposite to the second principal surface 110b of the insulating resin body 110.

The metallic layer 140 contains aluminum (Al). According to the present embodiment, the metallic layer 140 is composed of aluminum foil that has a porous outer surface. It is to be noted that the metallic layer 140 may alternatively be composed of other materials, for example, a valve action metal such as tantalum (Ta) or niobium (Nb).

The dielectric layer 150 is provided on the outer surface of the metallic layer 140. According to the present embodiment, the dielectric layer 150 is composed of an oxide of aluminum (Al). Specifically, the dielectric layer 150 is composed of an oxide of aluminum (Al) formed by applying anodization treatment to the outer surface of the metallic layer 140.

As best shown in FIGS. 1 and 2, the cathode part 160 has a solid electrolyte layer 161 and a current collector layer. In this embodiment the solid electrolyte layer 161 is provided on part of the outer surface of the dielectric layer 150. More particularly, the solid electrolyte 161 is not provided on the portion of the outer surface of the dielectric layer 150 located on the portion of the outer surface of the metallic layer 140 which is closer to the second end surface 110f and which is located on the side opposite to the cathode part 160. The portion of the outer metallic surface which is adjacent to the portion provided with the solid electrolyte layer 161 has an outer surface covered with an insulating resin layer 151 to be described later.

As shown in FIG. 2, the solid electrolyte layer 161 is provided to fill the number of depressions of the metallic layer 140. However, the outer surface of the dielectric layer 150 only has to be partially covered with the solid electrolyte layer 161 (as mentioned above) and the metallic layer 140 may have depressions that are not filled with the solid electrolyte layer 161. The solid electrolyte layer 161 is composed of, for example, a polymer including a conducting polymer such as poly(3,4-ethylenedioxythiophene).

The current collector layer is provided on at least a portion of the outer surface of the solid electrolyte layer 161. According to the present embodiment, the current collector layer is composed of a first current collector layer 162 provided on the outer surface of the solid electrolyte layer 161, and a second accumulation layer 163 provided on the outer surface of the first current collector layer 162. The first current collector layer 162 contains carbon (C). The second accumulation layer 163 contains silver (Ag).

As mentioned above, the portion of the dielectric layer 150 which is not provided with the solid electrolyte layer 161, is covered with the insulating resin layer 151 which is preferably different in composition from the insulating resin body 110.

As shown in FIG. 2, the insulating resin layer 151 is provided to fill a number of depressions at the outer surface of the metallic layer 140 adjacent to the portion of the anode part provided with the solid electrolyte layer 161. The insulating resin layer 151 preferably includes an insulating resin such as a polyimide resin or a polyamideimide resin.

As shown in FIGS. 1 and 3 (which is a cross section along lines III-III of FIG. 1), the current collector layers of the capacitor elements 180 adjacent to each other in the stacking direction are electrically connected to each other by a connection conductor layer 190. The width of the connection conductor layer 190 in the width direction W is equivalent to the width of the metallic layer 140 in the width direction W. The connection conductor layer 190 preferably contains silver (Ag).

The metallic layers 140 of the capacitor elements 180 adjacent to each other in the stacking direction have their ends which are located closer to the second end surface 110f electrically connected to each other by resistance welding or the like.

The first terminal 120 is preferably a lead frame and is electrically connected to the respective cathode parts 160 of the three or more capacitor elements 180. The first terminal 120 extends to the outside of the insulating resin body 110. The part of the first terminal 120 located within the insulating resin body 110 opposes the respective current collector layers of two capacitor elements 180 which are adjacent to one another in the stacking direction and is connected by the connection conductor layer 190 to each of the current collector layers. The part of the first terminal 120 located outside the insulating resin body 110 is preferably bent along the first end surface 110e and second principal surface 110b of the insulating resin body 110.

The second terminal 130 is also preferably a lead frame. The second terminal 130 is electrically connected to the respective anode parts of the three or more capacitor elements 180 and extends to the outside of the insulating resin body 110. The part of the second terminal 130 located within the insulating resin body 110 is sandwiched between ends of the metallic layers 140 of two capacitor elements 180 which are adjacent to each other in the stacking direction and which are closer to the second end surface 110f and connected by resistance welding or the like to each of the metallic layers 140.

According to the present embodiment, the elastic layers 170 are in contact with only the first and second capacitor elements 180a and 180b of the three or more capacitor elements 180. That is, the elastic layers 170 are not in contact with the capacitor elements 180 other than the first capacitor element 180a and the second capacitor element 180b.

However, the elastic layers 170 may be in contact with the capacitor elements 180 other than the first capacitor element 180a and the second capacitor element 180b. In this case, the area of contact between the first capacitor element 180a and the elastic layer 170 and the area of contact between the second capacitor element 180b and the elastic layer 170 are each larger than the areas of contact between the elastic layers 170 and the capacitor elements 180 other than the first capacitor element 180a and the second capacitor element 180b of the three or more capacitor elements 180.

As best shown in FIG. 2, the elastic layers 170 are provided (at least partially) at the boundary between the insulating resin body 110 and a surface of the cathode part 160 of the first capacitor element 180a on one side as mentioned above, and (at least partially) at the boundary between the insulating resin body 110 and a surface of the cathode part 160 of the second capacitor element 180b on the other side as mentioned above. The surface of the cathode part 160 of the first capacitor element 180a on one side as mentioned above is opposite to the first principal surface 110a of the insulating resin body 110. The surface of the cathode part 160 of the second capacitor element 180b on the other side as mentioned above is opposite to the second principal surface 110b of the insulating resin body 110.

The elastic layer 170 may be provided over the entire surface of the cathode part 160 of the first capacitor element 180a on one side as mentioned above or disposed dispersively on the surface of the cathode part 160 of the first capacitor element 180a on one side as mentioned above. Likewise, the elastic layer 170 may be provided over the entire surface of the cathode part 160 of the second capacitor element 180b on the other side as mentioned above or disposed dispersively on the surface of the cathode part 160 of the second capacitor element 180b on the other side as mentioned above.

According to the present embodiment, as shown in FIGS. 1 to 3, the elastic layer 170 is provided entirely over the entire outer surface of the cathode part 160 of the first capacitor element 180a which faces (is opposed to) the first principal surface 110a, first side surface 110c, second side surface 110d, and first end surface 110e of the insulating resin body 110. Likewise, the elastic layer 170 is provided over the entire outer surface of the cathode part 160 of the second capacitor element 180b which faces (is opposed to) the second principal surface 110b, first side surface 110c, second side surface 110d, and first end surface 110e of the insulating resin body 110.

According to the present embodiment, the elastic layers 170 are composed of a silicone rubber. However, the material of the elastic layers 170 is not limited to any silicone rubber, but may be a fluorine rubber, a polyimide resin, and the like.

Figure 4:
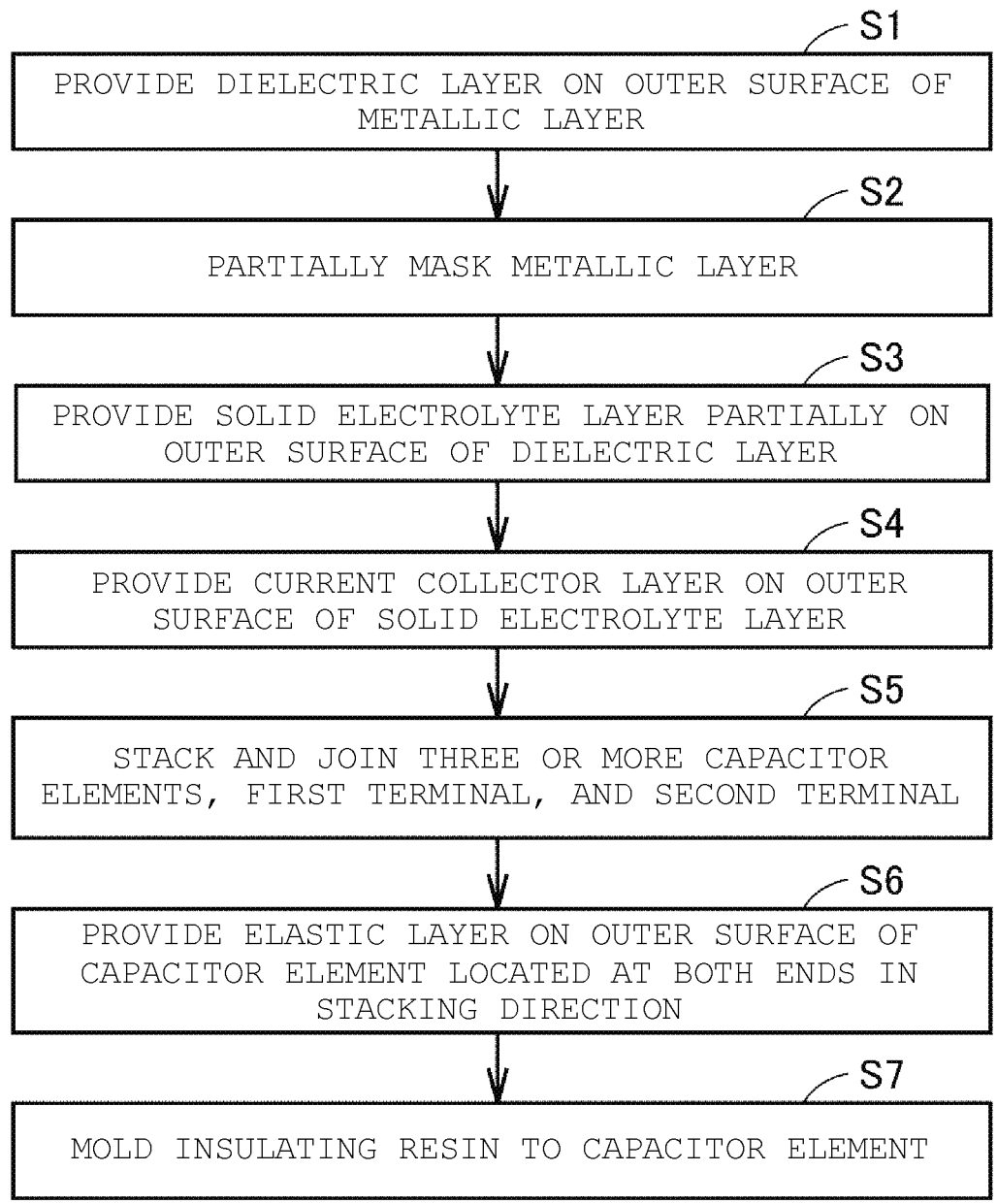
FIG. 4 is a flow diagram showing a method for manufacturing a solid electrolytic capacitor according to an embodiment of the present invention.

A method for manufacturing the solid electrolytic capacitor 100 according to an embodiment of the present invention will be described below with reference to the drawings. FIG. 4 is a flow diagram showing a method for manufacturing a solid electrolytic capacitor according to an embodiment of the present invention.

As shown in FIG. 4, first, the dielectric layer 150 is provided on the outer surface of the metallic layer 140 for the manufacture of the solid electrolytic capacitor 100 according to an embodiment of the present invention (step S1). According to the present embodiment, an oxide of aluminum (Al) for the dielectric layer 150 is formed by anodization treatment through immersion of aluminum foil for the metallic layer 140 in an aqueous solution of ammonium adipate. It is to be noted that in the case of cutting aluminum foil with an oxide of aluminum (Al) already formed, and using the cut foil as the metallic layer 140, the cut metallic layer 140 is immersed again in an aqueous solution of ammonium adipate for anodization treatment in order to form an oxide of aluminum (Al) at the cut surface.

Next, the metallic layer 140 is partially masked (step S2). This masking is carried out in order to define a region where the solid electrolyte layer 161 is to be formed in the next step. Specifically, a masking agent composed of an insulating resin such as a polyimide resin or a polyamideimide resin is applied partially to the outer surface of the metallic layer 140. The masking part formed by this step serves as the insulating resin layer 151.

Next, the solid electrolyte layer 161 is provided partially on the outer surface of the dielectric layer 150 (step S3). Specifically, a treatment liquid including 3,4-ethylenedioxythiophene and an oxidant is attached to the outer surface of the dielectric layer 150 located in the region defined by the masking part formed in the step S2, where the solid electrolyte layer 161 is to be formed, thereby forming a polymerized film. The treatment liquid is a dispersion of a conducting polymer, and the polymerized film serves as the solid electrolyte layer 161.

Next, the current collector layer is provided on the outer surface of the solid electrolyte layer 161 (step S4). Specifically, carbon (C) is applied to the outer surface of the solid electrolyte layer 161, thereby forming the first current collector layer 162. Silver (Ag) is applied to the outer surface of the first current collector layer 162, thereby forming the second accumulation layer 163.

Next, the three or more capacitor elements 180, the first terminal 120, and the second terminal 130 are stacked and joined (step S5). Specifically, with a conductive adhesive such as an Ag paste, the respective current collector layers of two capacitor elements 180 located to sandwich the first terminal 120 are connected to the first terminal 120, and the current collector layers of the capacitor elements 180 adjacent to each other are connected to each other. By resistance welding or the like, the respective metallic layers 140 of the two capacitor elements 180 located to sandwich the second terminal 130 are connected to the second terminal 130, and the metallic layers 140 of the capacitor elements 180 adjacent to each other are connected to each other.

Next, the elastic layers 170 are provided on the respective outer surfaces of the first capacitor element 180a and second capacitor element 180b located at both ends in the stacking direction (step S6). Specifically, a silicone rubber prepared in the form of a liquid is attached by a jet dispenser to the respective outer surfaces of the first capacitor element 180a and second capacitor element 180b, and subjected to curing by drying.

It is to be noted that in the case of dispersively disposing the elastic layers 170, the silicone rubber is applied with the use of a mask.

Next, an insulating resin is molded to the capacitor elements 180 (step S7). Specifically, the insulating resin body 110 is formed by a transfer molding method.

The solid electrolytic capacitor 100 can be manufactured through the series of steps described above.

The solid electrolytic capacitor 100 according to the present embodiment has the elastic layers 170 provided at the boundary between the cathode part 160 of the first capacitor element 180a and the insulating resin body 110 and the boundary between the cathode part 160 of the second capacitor element 180b and the insulating resin body 110, thereby making it possible for the elastic layers 170 to prevent compressive stress generated in molding the resin to the capacitor elements 180 and tensile stress generated in mounting the solid electrolytic capacitor 100 onto a substrate by a reflow process with a solder each from being applied as loads on the capacitor elements 180. More specifically, the elastic layers 170 can relax each of the compressive stress and tensile stress applied as loads on the capacitor elements 180.

As a result, the dielectric layer 150 can be prevented from being damaged by the load of the compressive stress, thereby making it possible to keep the reliability of the solid electrolytic capacitor 100 high with a suppressed increase in leakage current. In addition, delamination can be prevented from being caused by the load of the tensile stress within the capacitor elements 180, specifically, delamination between the first current collector layer 162 and the second accumulation layer 163 and delamination between the first current collector layer 162 and the solid electrolyte layer 161 can be prevented, thereby making it possible to reduce the ESR of the solid electrolytic capacitor 100.

In the solid electrolytic capacitor 100 according to the present embodiment, the first capacitor element 180a and the second capacitor element 180b with the highest compressive stress and tensile stress applied thereto as loads are provided with the elastic layers 170, thus making it possible to reduce the ESR while maintain high reliability with a suppressed increase in leakage current in an effective manner.

In the solid electrolytic capacitor 100 according to the present embodiment, the elastic layers 170 are provided only for the first and second capacitor elements 180a and 180b, but not provided for the other capacitor elements 180. The silicone rubber constituting the elastic layers 170 is low in thermal conductivity, and thus, when the whole outer circumference of the capacitor elements 180 stacked is covered with the elastic layers 170, heat release from the solid electrolytic capacitor is blocked, thereby decreasing the reliability of the solid electrolytic capacitor. Therefore, for the solid electrolytic capacitor 100 according to the present embodiment, the elastic layers 170 are provided only for the first capacitor element 180a and the second capacitor element 180b, thereby making it possible to maintain the heat release performance of the solid electrolytic capacitor, and thus keep the reliability of the solid electrolytic capacitor 100 high.

In addition, when the elastic layers 170 are dispersively disposed on each of: the surface of the cathode part 160 of the first capacitor element 180a on one side as mentioned above and the surface of the cathode part 160 of the second capacitor element 180b on the other side as mentioned above, the heat release performance of the solid electrolytic capacitor can be kept high while relaxing each of compressive stress and tensile stress applied to the capacitor elements 180 as loads.

Alternatively, the elastic layers 170 may be provided over the entire boundary between the current collector layer of the first capacitor element 180a and the insulating resin body 110 and entirely over the boundary between the current collector layer of the second capacitor element 180b and the insulating resin body 110.

Figure 5:
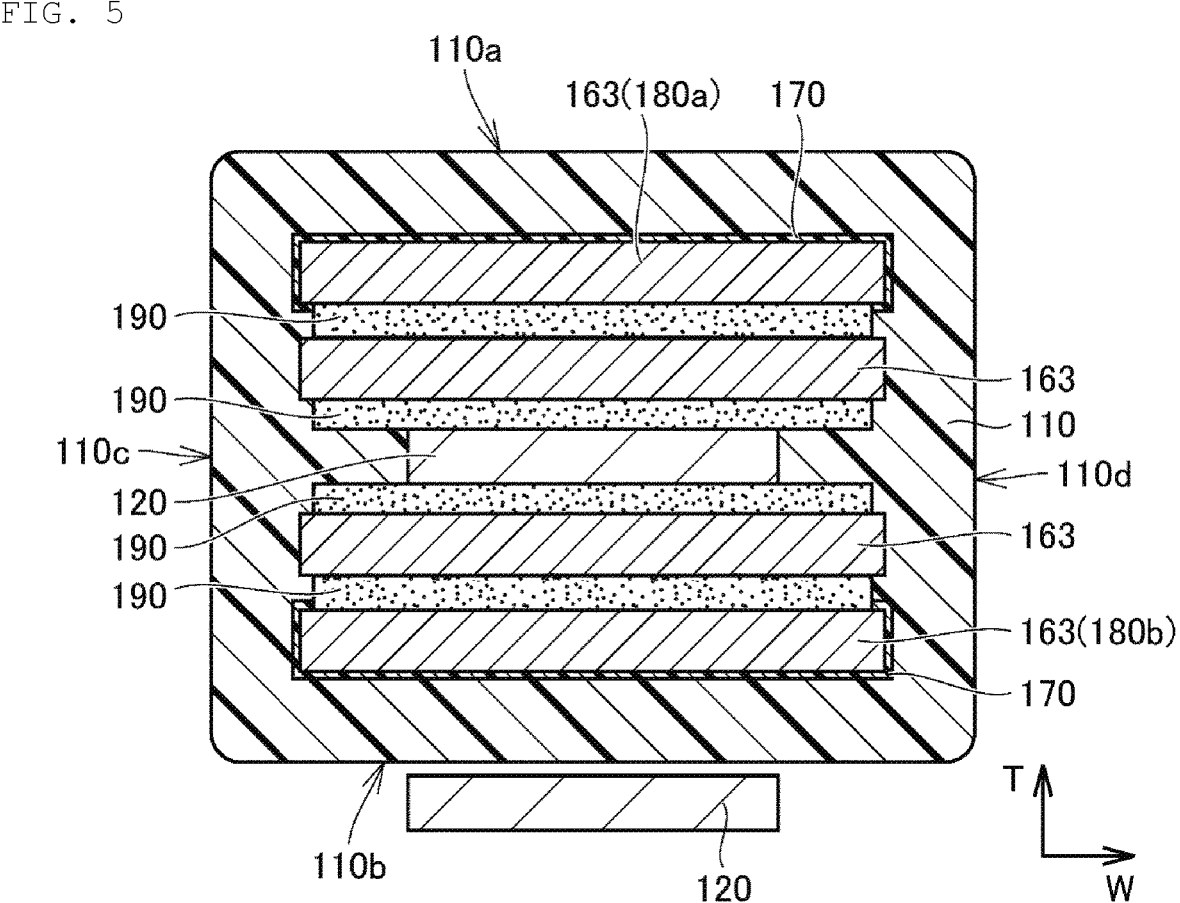
FIG. 5 is a cross-sectional view illustrating a configuration of a solid electrolytic capacitor according to a first modification example from an embodiment of the present invention.

FIG. 5 is a cross-sectional view illustrating a configuration of a solid electrolytic capacitor according to a first modification example from an embodiment of the present invention. FIG. 5 illustrates the configuration in the same cross-sectional view as FIG. 3.

As shown in FIG. 5, in the solid electrolytic capacitor according to the first modification example from an embodiment of the present invention, elastic layers 170 are provided over the entire boundary between the current collector layer of the first capacitor element 180a and the insulating resin body 110 and over the entire boundary between the current collector layer of the second capacitor element 180b and the insulating resin body 110. More specifically, the elastic layer 170 wraps around the outer surface of the current collector layer 162 of the first capacitor element 180a. Likewise, the elastic layer 170 wraps around the outer surface of the current collector layer 162 of the second capacitor element 180b.

In the solid electrolytic capacitor according to the first modification example from an embodiment of the present invention, the elastic layers 170 are provided over the entire boundaries between the insulating resin body 110 and the respective current collector layers 162 of the first and second capacitor elements 180a and 180b with the highest compressive stress and tensile stress applied thereto as loads thus making it possible for the elastic layers 170 to hold the respective current collector layers of the first capacitor element 180a and second capacitor element 180b so as to sandwich outer edges thereof and prevent delamination in an effective manner.

Furthermore, the elastic layer 170 may include a part that is thicker in areas where the insulating resin body 110 is thinner in the stacking direction of the capacitor elements 180. More specifically, the thickness of the elastic layer 170 may vary depending on the thickness of the insulating resin body 110.

Figure 6:
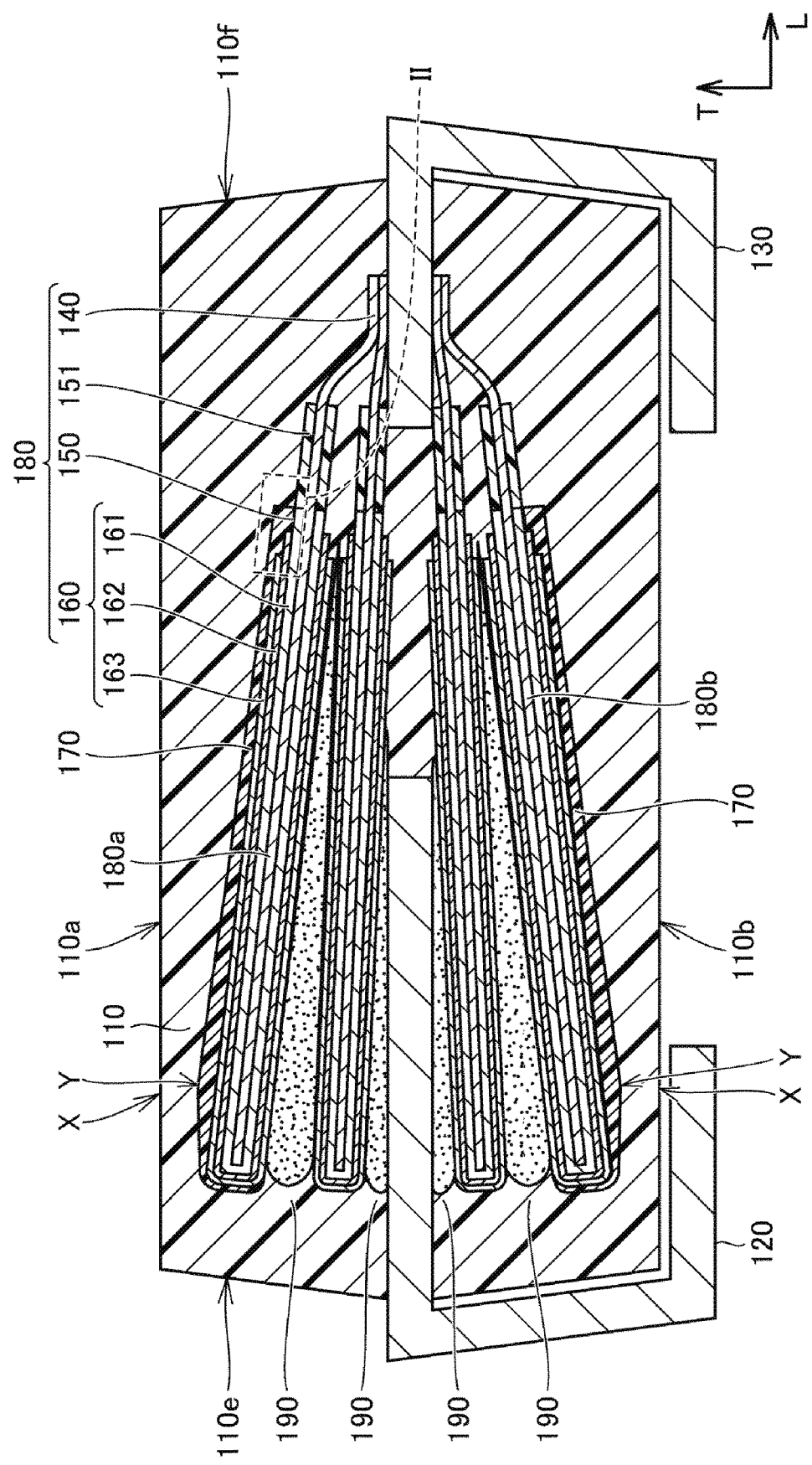
FIG. 6 is a cross-sectional view illustrating a configuration of a solid electrolytic capacitor according to a second modification example from an embodiment of the present invention.

FIG. 6 is a cross-sectional view illustrating a configuration of a solid electrolytic capacitor according to a second modification example from an embodiment of the present invention. FIG. 6 illustrates the configuration in the same cross-sectional view as FIG. 1. As shown in FIG. 6, in the solid electrolytic capacitor according to the second modification example from an embodiment of the present invention, elastic layers 170 each include a part that is thicker as the insulating resin body 110 is thinner adjacent in the stacking direction of capacitor elements 180. Specifically, the insulating resin body 110 has a thin part X with the smallest thickness in the stacking direction of the capacitor elements 180. The elastic layer 170 has a thick part Y with the largest thickness in the stacking direction of the capacitor elements 180. The thick part Y of the elastic layer 170 is in contact with the thin part X of the insulating resin body 110.

The insulating resin body 110 is likely to deform around the thin part X, and the capacitor element 180 adjacent to the thin part X of the insulating resin body 110 is thus likely to have compressive stress and tensile stress applied as loads. The thick part Y of the elastic layer 170 is provided to be in contact with the thin part X of the insulating resin body 110, thereby making it possible to relax compressive stress and tensile stress applied as loads to the capacitor elements 180 in an effective manner, and thus suppress increases in ESR and leakage current.

Experimental Example 1

In this regard, Experimental Example 1 will be described where the difference in the change in magnitude of leakage current between before and after molding a resin to a capacitor element was verified depending on the presence or absence of an elastic layer.

Sixty-five solid electrolytic capacitors 100 according to the present embodiment were prepared as solid electrolytic capacitors according to Example 1. Sixty-five solid electrolytic capacitors different from the solid electrolytic capacitors 100 according to the present embodiment only in that no elastic layer 170 was provided were prepared as solid electrolytic capacitors according to Comparative Example 1.

Figure 7:
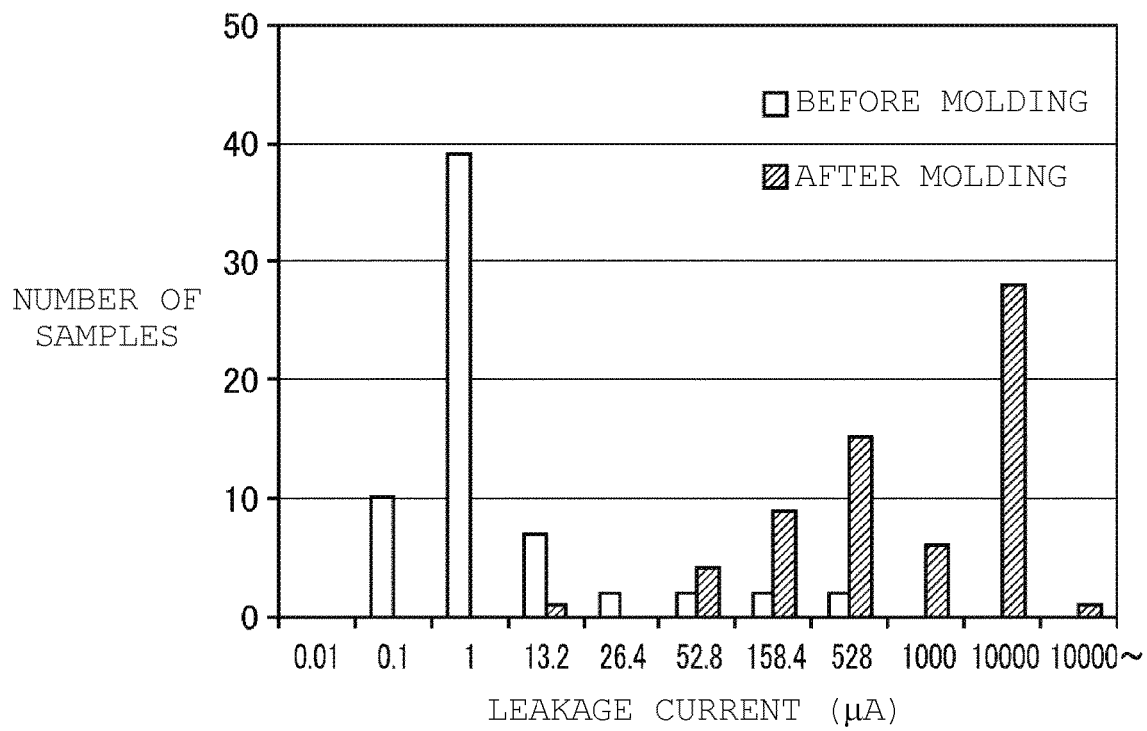
FIG. 7 is a graph showing the results of measuring leakage current values before and after molding a resin to solid electrolytic capacitors according to Comparative Example 1 in Experimental Example 1.
Figure 8:
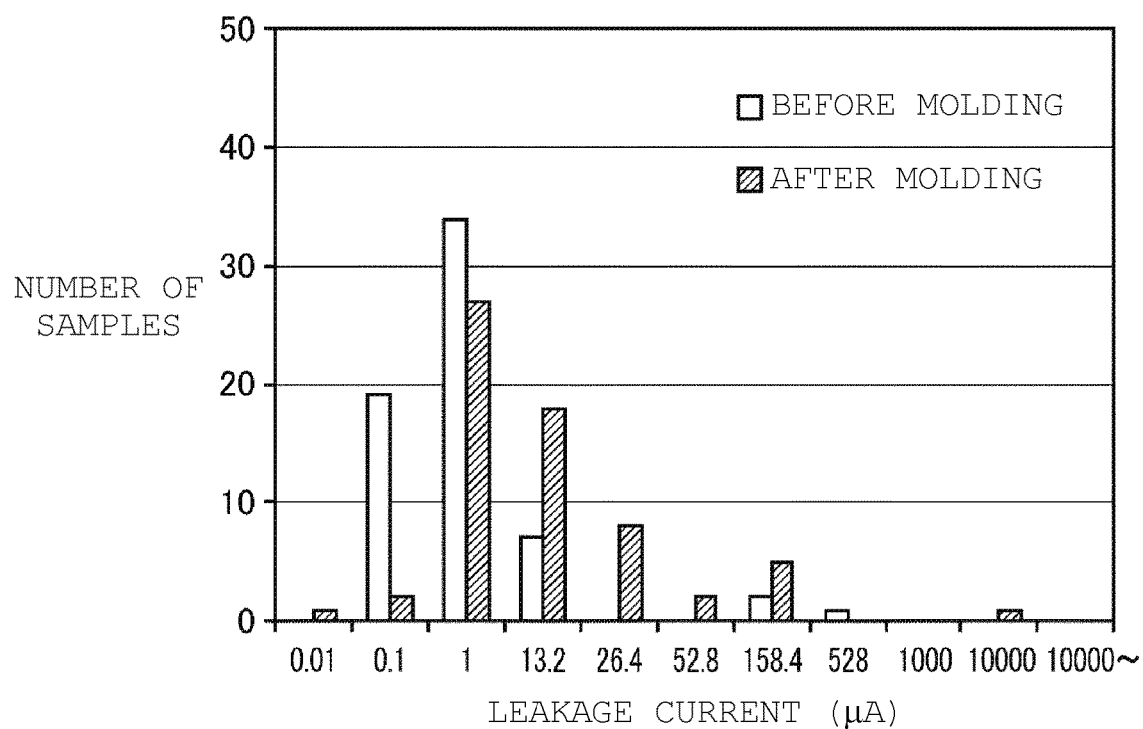
FIG. 8 is a graph showing the results of measuring leakage current values before and after molding a resin to solid electrolytic capacitors according to Example 1 in Experimental Example 1.

The leakage current values before and after molding a resin were measured for the solid electrolytic capacitors according to Example 1 and the solid electrolytic capacitors according to Comparative Example 1. FIG. 7 is a graph showing the results of measuring the leakage current values before and after molding the resin to the solid electrolytic capacitors according to Comparative Example 1 in Experimental Example 1. FIG. 8 is a graph showing the results of measuring the leakage current values before and after molding the resin to the solid electrolytic capacitors according to Example 1 in Experimental Example 1. In FIGS. 7 and 8, the vertical axis indicates the number of samples, whereas the horizontal axis indicates a leakage current value ($\mu A$).

As shown in FIG. 7, in the case of the solid electrolytic capacitors according to Comparative Example 1, the leakage current values after the molding are obviously larger than the leakage current values before the molding. As shown in FIG. 8, the solid electrolytic capacitors according to Example 1 have reduced the increases from the leakage current values before the molding to the leakage current values after the molding, as compared with the solid electrolytic capacitors according to Comparative Example 1.

From the results of Experimental Example 1, it has been successfully confirmed that the increases in leakage current after molding the resin to the capacitor elements can be suppressed by providing the elastic layers 170.

Experimental Example 2

Next, Experimental Example 2 will be described where the difference in the change in magnitude of ESR between before and after mounting a solid electrolytic capacitor onto a substrate by a reflow process with a solder was verified depending on the presence or absence of an elastic layer.

As a condition for the reflow process, the capacitor was passed through a reflow furnace three times, in such a way that the capacitor was passed through the reflow furnace with a temperature kept at 270° C. over 10 seconds. The ESR was measured by applying an alternating-current voltage with a frequency of 100 kHz to the solid electrolytic capacitor.

Figure 9:
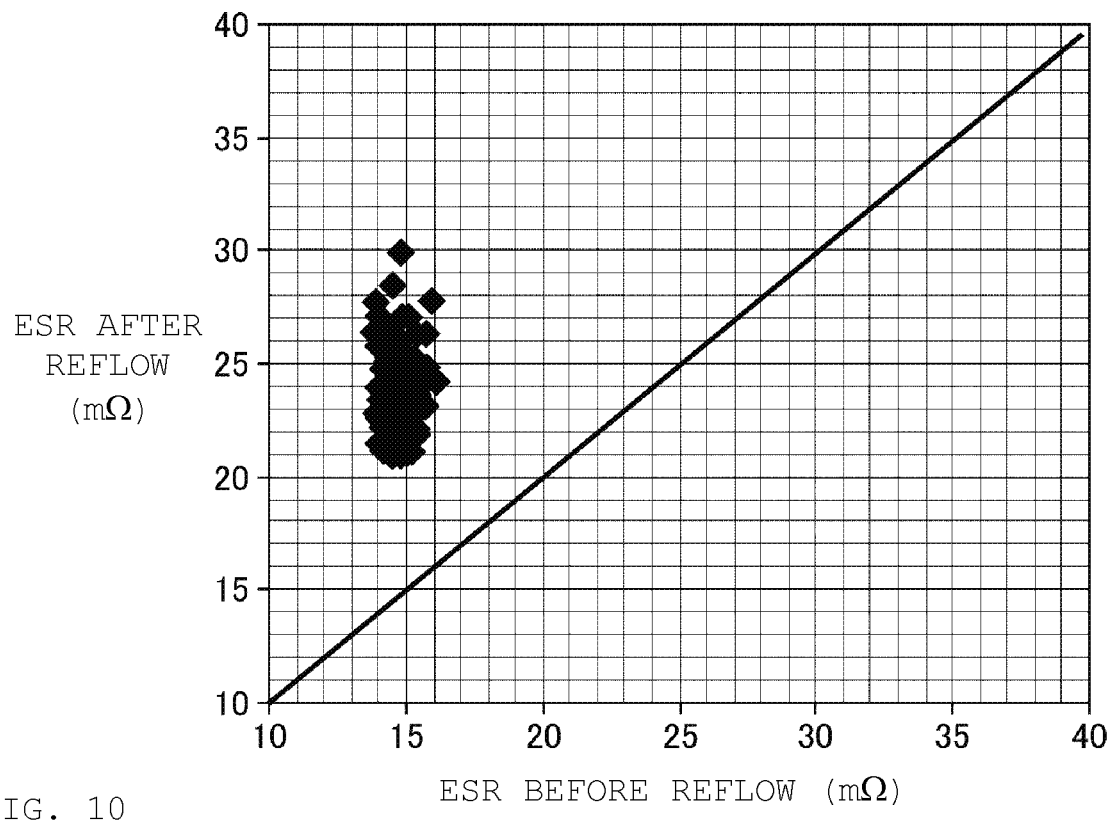
FIG. 9 is a graph showing the results of measuring ESR values before and after applying a reflow process to the solid electrolytic capacitors according to Comparative Example 1 in Experimental Example 2.
Figure 10:
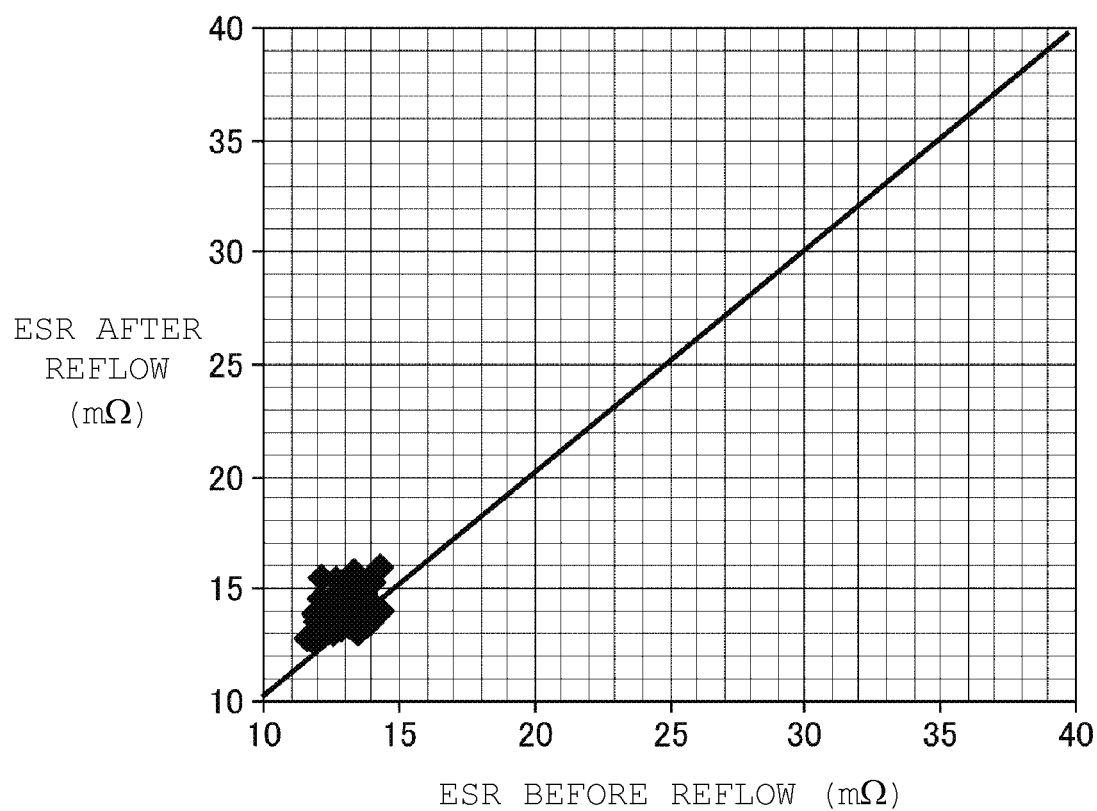
FIG. 10 is a graph showing the results of measuring ESR values before and after applying the reflow process to the solid electrolytic capacitors according to Example 1 in Experimental Example 2.

The ESR values before and after the reflow process were measured for the solid electrolytic capacitors according to Example 1 and the solid electrolytic capacitors according to Comparative Example 1. FIG. 9 is a graph showing the results of measuring the ESR values before and after applying the reflow process to the solid electrolytic capacitors according to Comparative Example 1 in Experimental Example 2. FIG. 10 is a graph showing the results of measuring the ESR values before and after applying the reflow process to the solid electrolytic capacitors according to Example 1 in Experimental Example 2. In FIGS. 9 and 10, the vertical axis indicates an ESR value (mΩ) after the reflow process, whereas the horizontal axis indicates an ESR value (mΩ) before the reflow process. In addition, in FIGS. 9 and 10, an imaginary line is shown which indicates that the ESR value before the reflow process transitions equally to the ESR value after the reflow process.

As shown in FIG. 9, in the case of the solid electrolytic capacitors according to Comparative Example 1, the ESR values after the reflow process are obviously larger than the ESR values before the reflow process. As shown in FIG. 10, the solid electrolytic capacitors according to Example 1 have reduced the increases from the ESR values before the reflow process to the ESR values after the reflow process, as compared with the solid electrolytic capacitors according to Comparative Example 1.

From the results of Experimental Example 2, it has been successfully confirmed that the increases in ESR after applying the reflow process to the capacitor elements can be suppressed by providing the elastic layers 170.

Experimental Example 3

Next, Experimental Example 3 will be described where the difference in the characteristic changes of a solid electrolytic capacitor between before and after mounting a solid electrolytic capacitor onto a substrate by a reflow process with a solder was verified depending on the presence or absence of an elastic layer.

Twenty solid electrolytic capacitors different from the solid electrolytic capacitors 100 according to Example 1 only in that the whole outer circumference of capacitor elements stacked was covered with an elastic layer were prepared as solid electrolytic capacitors according to Comparative Example 2.

Figure 11:
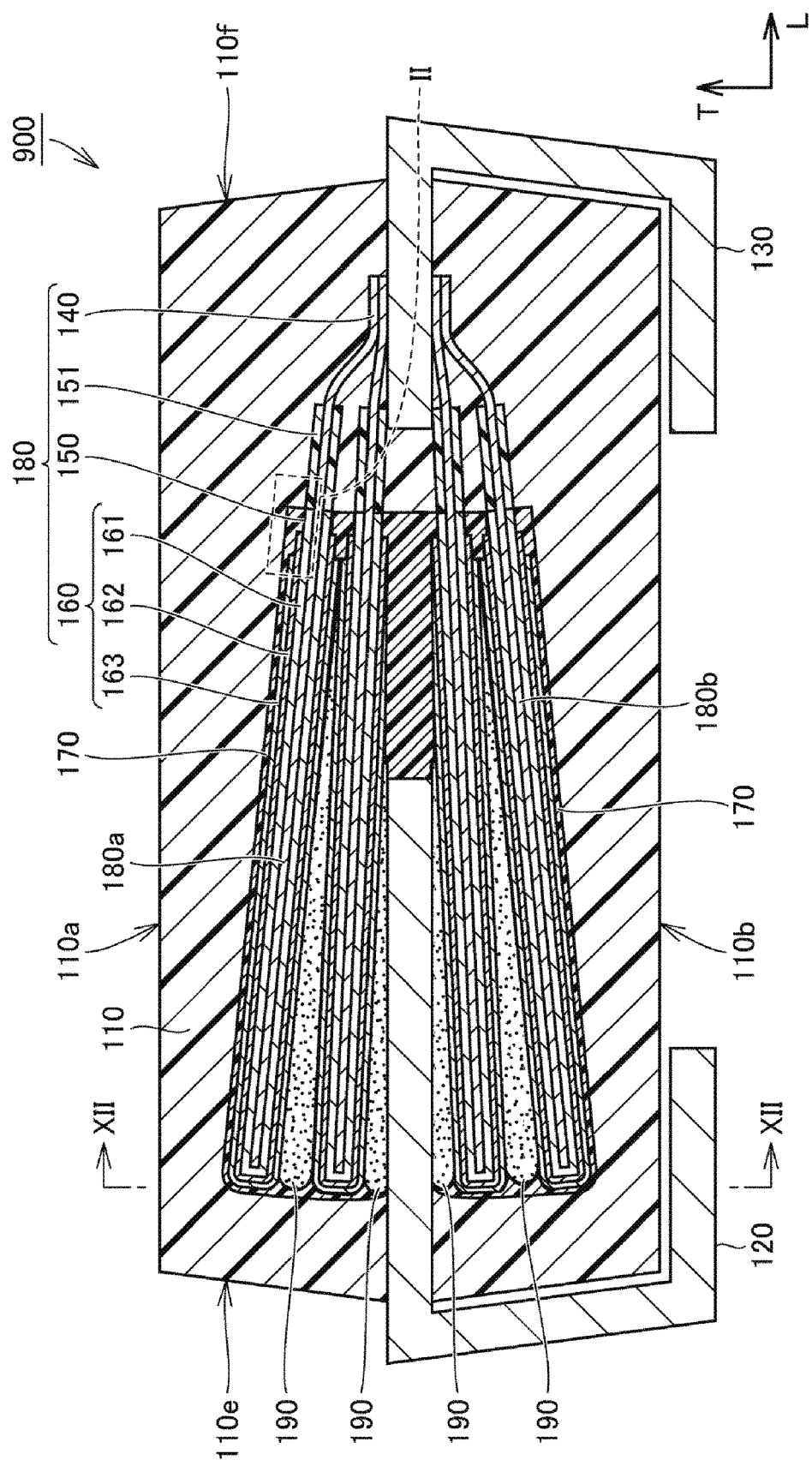
FIG. 11 is a cross-sectional view illustrating a configuration of a solid electrolytic capacitor according to Comparative Example 2.
Figure 12:
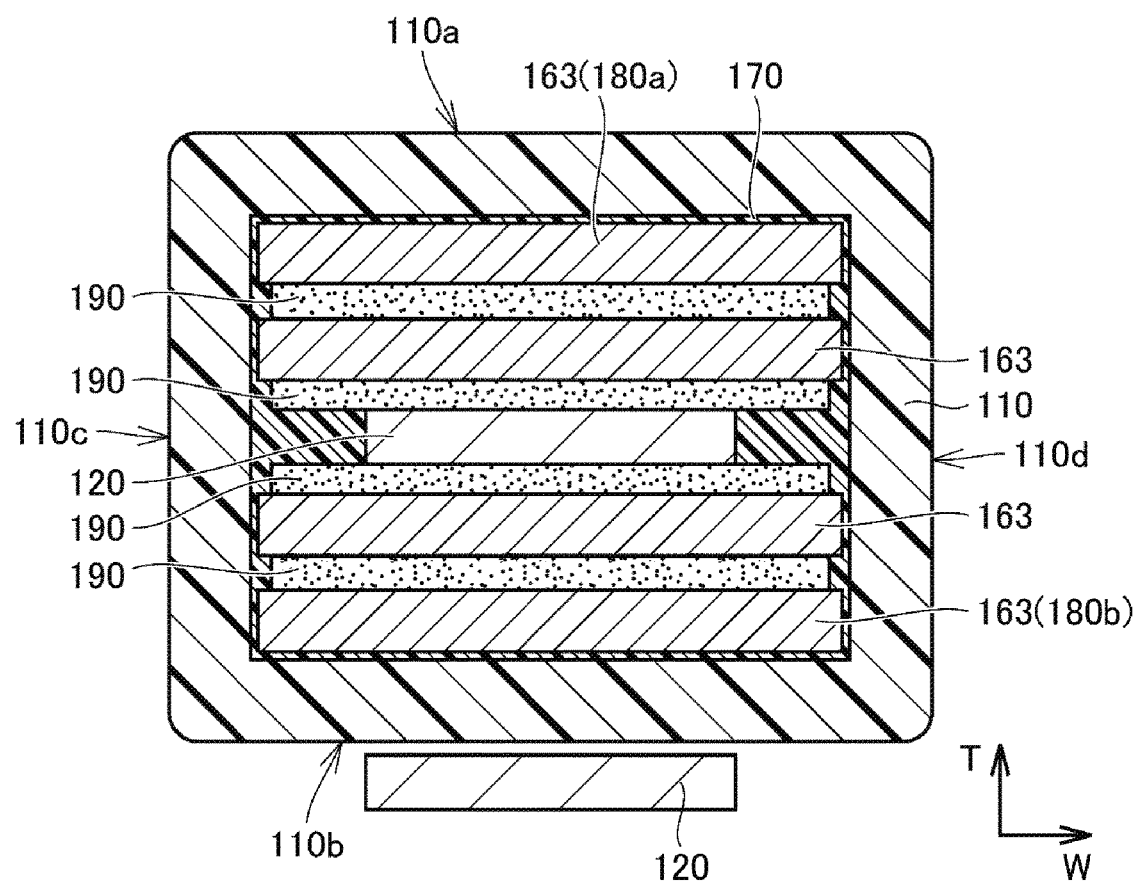
FIG. 12 is a cross-sectional view of the solid electrolytic capacitor in FIG. 11, as viewed from the direction of an arrow along line XII-XII.

FIG. 11 is a cross-sectional view illustrating a configuration of a solid electrolytic capacitor according to Comparative Example 2. FIG. 12 is a cross-sectional view of the solid electrolytic capacitor in FIG. 11, as viewed from the direction of an arrow along line XII-XII. FIG. 11 illustrates the configuration in the same cross-sectional view as FIG. 1. As shown in FIGS. 11 and 12, in a solid electrolytic capacitor 900 according to Comparative Example 2, the entire outer circumference of capacitor elements 180 is covered with an elastic layer 170.

As a condition for the reflow process, the capacitor was passed through a reflow furnace three times, in such a way that the capacitor was passed through the reflow furnace with a temperature kept at 270° C. over 10 seconds. Electrostatic capacitance (μF), dielectric loss (DF: Dissipation Factor) (%), ESR (mΩ), and leakage current (μA) were measured as characteristics of the solid electrolytic capacitors. The ESR was measured by applying an alternating-current voltage with a frequency of 100 kHz to the solid electrolytic capacitor. It is to be noted that the characteristic values each refer to a value obtained by calculating the average value for the twenty solid electrolytic capacitors.

TABLE 1

| | Before Reflow Process | | | | After Reflow Process | | | |
|---|---|---|---|---|---|---|---|---|
| | Electrostatic Capacitance (μF) | Dielectric Loss (%) | ESR (mΩ) | Leakage Current (μA) | Electrostatic Capacitance (μF) | Dielectric Loss (%) | ESR (mΩ) | Leakage Current (μA) |
| Comparative Example 1 | 32.5 | 1.01 | 25.3 | 0.11 | 31.6 (97%) | 1.02 (101%) | 33.4 (132%) | 0.15 (136%) |
| Comparative Example 2 | 32.4 | 1.03 | 24.8 | 0.09 | 31.3 (97%) | 1.03 (100%) | 27.6 (111%) | 0.11 (122%) |
| Example 1 | 32.7 | 1.00 | 24.6 | 0.08 | 31.6 (97%) | 1.02 (102%) | 27.7 (113%) | 0.10 (125%) |

Table 1 shows the respective characteristic values of the solid electrolytic capacitors before and after the reflow process in Experimental Example 3. Table 1 lists therein, below the respective characteristic values after the reflow process, the ratios (%) thereof to the characteristic values before the reflow process.

As shown in Table 1, before the reflow process, the electrostatic capacitance (μF) is 32.5 in Comparative Example 1, 32.4 in Comparative Example 2, and 32.7 in Example 1, the dielectric loss (%) is 1.01 in Comparative Example 1, 1.03 in Comparative Example 2, and 1.00 in Example 1, the ESR (mΩ) is 25.3 in Comparative Example 1, 24.8 in Comparative Example 2, and 24.6 in Example 1, and the leakage current (μA) is 0.11 in Comparative Example 1, 0.09 in Comparative Example 2, and 0.08 in Example 1.

Before the reflow process, the electrostatic capacitance (μF) is 31.6 in Comparative Example 1, 31.3 in Comparative Example 2, and 31.6 in Example 1, the dielectric loss (%) is 1.02 in Comparative Example 1, 1.03 in Comparative Example 2, and 1.02 in Example 1, the ESR (mΩ) is 33.4 in Comparative Example 1, 27.6 in Comparative Example 2, and 27.7 in Example 1, and the leakage current (μA) is 0.15 in Comparative Example 1, 0.11 in Comparative Example 2, and 0.10 in Example 1.

As shown in Table 1, after the reflow process, the electrostatic capacitance (μF) is decreased, the dielectric loss (%) is comparable or higher, the ESR (mΩ) is increased, and the leakage current (μA) is increased as compared with before the reflow process. In particular, in the case of the solid electrolytic capacitors according to Comparative Example 1, the ESR values and leakage current values after the reflow process are obviously larger than those before the reflow process. The solid electrolytic capacitors according to Comparative Examples 2 and Example 1 have reduced the increases from the ESR values and the leakage current values before the reflow process to those after the reflow process, as compared with the solid electrolytic capacitors according to Comparative Example 1.

From the results of Experimental Example 3, it has been successfully confirmed that the increases in ESR and leakage current after applying the reflow process to the capacitor elements can be suppressed by providing the elastic layer.

Experimental Example 4

Experimental Example 4 will be described where a high-temperature load test was conducted on the solid electrolytic capacitors according to Comparative Examples 1 and 2 and Example 1, used in Experimental Example 3. Respective characteristic values were measured after applying a voltage of 16 V to the solid electrolytic capacitors for 2000 hours in an atmosphere at a temperature of 105° C. as a condition for the high-temperature load test. It is to be noted that the characteristic values each refer to a value obtained by calculating the average value for the twenty solid electrolytic capacitors.

TABLE 2

| | After Reflow Process | | | | After High Temperature Load Test | | | |
|---|---|---|---|---|---|---|---|---|
| | Electrostatic Capacitance (μF) | Dielectric Loss (%) | ESR (mΩ) | Leakage Current (μA) | Electrostatic Capacitance (μF) | Dielectric Loss (%) | ESR (mΩ) | Leakage Current (μA) |
| Comparative Example 1 | 31.6 | 1.02 | 33.4 | 0.15 | 30.5 (96%) | 1.17 (115%) | 62.1 (186%) | 0.17 (113%) |
| Comparative Example 2 | 31.3 | 1.03 | 27.6 | 0.11 | 30.0 (96%) | 1.15 (112%) | 41.4 (150%) | 0.13 (118%) |
| Example 1 | 31.6 | 1.02 | 27.7 | 0.10 | 30.3 (96%) | 1.12 (110%) | 33.5 (121%) | 0.12 (120%) |

Table 2 shows the respective characteristic values of the solid electrolytic capacitors after the reflow process and after the high-temperature load test in Experimental Example 4. Table 2 lists therein, below the respective characteristic values after the high-temperature load test, the ratios (%) thereof to the characteristic values after the reflow process.

As shown in Table 2, after the high-temperature load test, the electrostatic capacitance (μF) is 30.3 in Comparative Example 1, 30.0 in Comparative Example 2, and 30.3 in Example 1, the dielectric loss (%) is 1.17 in Comparative Example 1, 1.15 in Comparative Example 2, and 1.12 in Example 1, the ESR (mΩ) is 62.1 in Comparative Example 1, 41.4 in Comparative Example 2, and 33.5 in Example 1, and the leakage current (μA) is 0.17 in Comparative Example 1, 0.13 in Comparative Example 2, and 0.12 in Example 1.

As shown in Table 2, after the high-temperature load test, the electrostatic capacitance (μF) is decreased, the dielectric loss (%) is increased, the ESR (mΩ) is increased, and the leakage current (μA) is increased as compared with after the reflow process. In particular, in the case of the solid electrolytic capacitors according to Comparative Examples 1 and 2, the ESR values after the high-temperature load test are obviously larger than those after the reflow process. The ESR values of the solid electrolytic capacitors according to Comparative Example 2 are larger because the whole outer circumference of the capacitor elements stacked is covered with the elastic layer, thus blocking heat release from the solid electrolytic capacitors, and causing delamination within the capacitor elements due to tensile stress produced by the difference in coefficient of thermal expansion between the resin and the capacitor elements.

The solid electrolytic capacitors according to Example 1 have reduced the increases from the ESR values after the reflow process to the ESR values after the high-temperature load test, as compared with the solid electrolytic capacitors according to Comparative Examples 1 and 2.

From the results of Experimental Example 4, it has been successfully confirmed that providing the elastic layers only for the first capacitor element 180a and the second capacitor element 180b can suppress the increase in ESR after the high-temperature load test, and maintain the reliability of the solid electrolytic capacitor.

In regard to the explanation of the embodiment described above, the configurations which can be combined may be combined with each other.

The embodiment disclosed herein should be considered exemplary in all respects, but not be considered limiting. The scope of the present invention is specified by the claims, but not the explanation mentioned above, and intended to encompass all modifications within the meaning and scope equivalent to the claims.

What is claimed is:

1. A solid electrolytic capacitor, comprising:
   (a) an insulating resin body have an outer surface;
   (b) first, second and third capacitor elements located one above the other in a stacking direction in the insulating resin body such that the third capacitor element is sandwiched between the first and second capacitor elements, each of the capacitor elements comprising:
      (i) a metallic anode with an outer surface provided with a number of depressions,
      (ii) a dielectric layer provided on the outer surface of the metallic anode, and
      (iii) a cathode comprising a solid electrolyte layer provided on at least part of an outer surface of the dielectric layer and a current collector layer provided on at least a part of an outer surface of the solid electrolyte layer;
   (c) a first elastic layer located between the insulating body and the surface of the cathode of the first capacitor element in the stacking direction, the first elastic layer being in contact with the first capacitor element along at least a part of a boundary between the insulating resin body and a surface of the cathode of the first capacitor element;
   (d) a second elastic layer located between the insulating body and the surface of the cathode of the second capacitor element in the stacking direction, the second elastic layer being in contact with the second capacitor element along at least a part of a boundary between the insulating resin body and a surface of the cathode of the second capacitor element;

(e) a first terminal electrically connected to the respective cathodes of the first, second and third capacitor elements and extending to the outer surface of the insulating resin body;
(f) a second terminal electrically connected to the respective anodes of the first, second and third capacitor elements and extended to the outer surface of the insulating resin body; and
(g) a third elastic layer in contact with the third capacitor element along at least a part of a boundary between the insulating resin body and a surface of the cathode of the third capacitor element.

2. The solid electrolytic capacitor according to claim 1, wherein an area of contact between the first capacitor element and the elastic layer and an area of contact between the second capacitor element and the elastic layer are each larger than an area of contact between the third elastic layer and the third capacitor element.

3. The solid electrolytic capacitor according to claim 1, wherein the first, second and third elastic layers comprise a silicone rubber.

4. The solid electrolytic capacitor according to claim 1, wherein:
a first portion of the insulating resin body located between the first capacitor element and the outer surface of the insulating resin body varies in thickness as measured in the stacking direction; and
the first elastic layer varies in thickness as measured in the stacking direction, the thickest part of the first elastic layer corresponding to the thinnest part of the first portion of the insulating resin body.

5. The solid electrolytic capacitor according to claim 4, wherein:
a second portion of the insulating resin body located between the second capacitor element and the outer surface of the insulating resin body varies in thickness as measured in the stacking direction; and
the second elastic layer varies in thickness as measured in the stacking direction, the thickest part of the second elastic layer corresponding to the thinnest part of the second portion of the insulating resin body.

6. The solid electrolytic capacitor according to claim 1, wherein the metallic anode comprises aluminum.

7. The solid electrolytic capacitor according to claim 1, further comprising at least a fourth capacitor element located between the first and second capacitor elements in the stacking direction, the at least a fourth capacitor element comprising:
(i) a metallic anode part having an outer surface provided with a number of depressions,
(ii) a dielectric layer provided on the outer surface of the metallic anode part, and
(iii) a cathode comprising a solid electrolyte layer provided on at least part of an outer surface of the dielectric layer and a current collector layer provided on at least a part of an outer surface of the solid electrolyte layer.

8. The solid electrolytic capacitor according to claim 1, wherein the dielectric layer comprises an oxide of aluminum.

9. A solid electrolytic capacitor, comprising:
(a) an insulating resin body have an outer surface;
(b) first, second and third capacitor elements located one above the other in a stacking direction in the insulating resin body such that the third capacitor element is sandwiched between the first and second capacitor elements, each of the capacitor elements comprising:
(i) a metallic anode with an outer surface provided with a number of depressions,
(ii) a dielectric layer provided on the outer surface of the metallic anode, and
(iii) a cathode comprising a solid electrolyte layer provided on at least part of an outer surface of the dielectric layer and a current collector layer provided on at least a part of an outer surface of the solid electrolyte layer;
(c) a first elastic layer located between the insulating body and the surface of the cathode of the first capacitor element in the stacking direction, the first elastic layer being in contact with the first capacitor element along at least a part of a boundary between the insulating resin body and a surface of the cathode of the first capacitor element;
(d) a second elastic layer located between the insulating body and the surface of the cathode of the second capacitor element in the stacking direction, the second elastic layer being in contact with the second capacitor element along at least a part of a boundary between the insulating resin body and a surface of the cathode of the second capacitor element;
(e) a first terminal electrically connected to the respective cathodes of the first, second and third capacitor elements and extending to the outer surface of the insulating resin body; and
(f) a second terminal electrically connected to the respective anodes of the first, second and third capacitor elements and extended to the outer surface of the insulating resin body
wherein:
the first elastic layer is provided over an entire boundary between the current collector layer of the first capacitor element and the insulating resin body; and
the second elastic layer is provided over an entire boundary between the current collector layer of the second capacitor element and the insulating resin body.

10. A solid electrolytic capacitor, comprising:
(a) an insulating resin body have an outer surface;
(b) first, second and third capacitor elements located one above the other in a stacking direction in the insulating resin body such that the third capacitor element is sandwiched between the first and second capacitor elements, each of the capacitor elements comprising:
(i) a metallic anode with an outer surface provided with a number of depressions,
(ii) a dielectric layer provided on the outer surface of the metallic anode, and
(iii) a cathode comprising a solid electrolyte layer provided on at least part of an outer surface of the dielectric layer and a current collector layer provided on at least a part of an outer surface of the solid electrolyte layer;
(c) a first elastic layer located between the insulating body and the surface of the cathode of the first capacitor element in the stacking direction, the first elastic layer being in contact with the first capacitor element along at least a part of a boundary between the insulating resin body and a surface of the cathode of the first capacitor element;
(d) a second elastic layer located between the insulating body and the surface of the cathode of the second capacitor element in the stacking direction, the second elastic layer being in contact with the second capacitor element along at least a part of a boundary between the insulating resin body and a surface of the cathode of the second capacitor element;

(e) a first terminal electrically connected to the respective cathodes of the first, second and third capacitor elements and extending to the outer surface of the insulating resin body; and (f) a second terminal electrically connected to the respective anodes of the first, second and third capacitor elements and extended to the outer surface of the insulating resin body wherein:

a first portion of the insulating resin body located between the first capacitor element and the outer surface of the insulating resin body varies in thickness as measured in the stacking direction; and the first elastic layer varies in thickness as measured in the stacking direction, the thickest part of the first elastic layer corresponding to the thinnest part of the first portion of the insulating resin body.

11. The solid electrolytic capacitor according to claim 10, wherein:

a second portion of the insulating resin body located between the second capacitor element and the outer surface of the insulating resin body varies in thickness as measured in the stacking direction; and the second elastic layer varies in thickness as measured in the stacking direction, the thickest part of the second elastic layer corresponding to the thinnest part of the second portion of the insulating resin body.

12. A solid electrolytic capacitor, comprising:

(a) an insulating resin body have an outer surface;

(b) first, second and third capacitor elements located one above the other in a stacking direction in the insulating resin body such that the third capacitor element is sandwiched between the first and second capacitor elements, each of the capacitor elements comprising:
 (i) a metallic anode with an outer surface provided with a number of depressions,
 (ii) a dielectric layer provided on the outer surface of the metallic anode, and
 (iii) a cathode comprising a solid electrolyte layer provided on at least part of an outer surface of the dielectric layer and a current collector layer provided on at least a part of an outer surface of the solid electrolyte layer;

(c) a first elastic layer in contact with the first capacitor element along at least a part of a boundary between the insulating resin body and a surface of the cathode of the first capacitor element;

(d) a second elastic layer in contact with the second capacitor element along at least a part of a boundary between the insulating resin body and a surface of the cathode of the second capacitor element;

(e) a first terminal electrically connected to the respective cathodes of the first, second and third capacitor elements and extending to the outer surface of the insulating resin body; and (f) a second terminal electrically connected to the respective anodes of the first, second and third capacitor elements and extended to the outer surface of the insulating resin body; and (g) a third elastic layer in contact with the third capacitor element along at least a part of a boundary between the insulating resin body and a surface of the cathode of the third capacitor element;

wherein:

an area of contact between the first capacitor element and the elastic layer and an area of contact between the second capacitor element and the elastic layer are each larger than an area of contact between the third elastic layer and the third capacitor element;

the first elastic layer is provided over an entire boundary between the current collector layer of the first capacitor element and the insulating resin body; and the second elastic layer is provided over an entire boundary between the current collector layer of the second capacitor element and the insulating resin body.

13. A solid electrolytic capacitor, comprising:

(a) an insulating resin body have an outer surface;

(b) first, second and third capacitor elements located one above the other in a stacking direction in the insulating resin body such that the third capacitor element is sandwiched between the first and second capacitor elements, each of the capacitor elements comprising:
 (i) a metallic anode with an outer surface provided with a number of depressions,
 (ii) a dielectric layer provided on the outer surface of the metallic anode, and
 (iii) a cathode comprising a solid electrolyte layer provided on at least part of an outer surface of the dielectric layer and a current collector layer provided on at least a part of an outer surface of the solid electrolyte layer;

(c) a first elastic layer in contact with the first capacitor element along at least a part of a boundary between the insulating resin body and a surface of the cathode of the first capacitor element;

(d) a second elastic layer in contact with the second capacitor element along at least a part of a boundary between the insulating resin body and a surface of the cathode of the second capacitor element;

(e) a first terminal electrically connected to the respective cathodes of the first, second and third capacitor elements and extending to the outer surface of the insulating resin body; and (f) a second terminal electrically connected to the respective anodes of the first, second and third capacitor elements and extended to the outer surface of the insulating resin body; wherein:

a first portion of the insulating resin body located between the first capacitor element and the outer surface of the insulating resin body varies in thickness as measured in the stacking direction; and the first elastic layer varies in thickness as measured in the stacking direction, the thickest part of the first elastic layer corresponding to the thinnest part of the first portion of the insulating resin body.

14. The solid electrolytic capacitor according to claim 13, wherein:

a second portion of the insulating resin body located between the second capacitor element and the outer surface of the insulating resin body varies in thickness as measured in the stacking direction; and the second elastic layer varies in thickness as measured in the stacking direction, the thickest part of the second elastic layer corresponding to the thinnest part of the second portion of the insulating resin body.

15. A solid electrolytic capacitor, comprising:

(a) an insulating resin body have an outer surface;

(b) first, second and third capacitor elements located one above the other in a stacking direction in the insulating resin body such that the third capacitor element is sandwiched between the first and second capacitor elements, each of the capacitor elements comprising:
  (i) a metallic anode with an outer surface provided with a number of depressions,
  (ii) a dielectric layer provided on the outer surface of the metallic anode, and
  (iii) a cathode comprising a solid electrolyte layer provided on at least part of an outer surface of the dielectric layer and a current collector layer provided on at least a part of an outer surface of the solid electrolyte layer;
(c) a first elastic layer in contact with the first capacitor element along at least a part of a boundary between the insulating resin body and a surface of the cathode of the first capacitor element;
(d) a second elastic layer in contact with the second capacitor element along at least a part of a boundary between the insulating resin body and a surface of the cathode of the second capacitor element;
(e) a first terminal electrically connected to the respective cathodes of the first, second and third capacitor elements and extending to the outer surface of the insulating resin body;
(f) a second terminal electrically connected to the respective anodes of the first, second and third capacitor elements and extended to the outer surface of the insulating resin body; and
(g) a third elastic layer in contact with the third capacitor element along at least a part of a boundary between the insulating resin body and a surface of the cathode of the third capacitor element;

wherein:
  a first portion of the insulating resin body located between the first capacitor element and the outer surface of the insulating resin body varies in thickness as measured in the stacking direction; and
  the first elastic layer varies in thickness as measured in the stacking direction, the thickest part of the first elastic layer corresponding to the thinnest part of the first portion of the insulating resin body.

16. The solid electrolytic capacitor according to claim 15, wherein:
  a second portion of the insulating resin body located between the second capacitor element and the outer surface of the insulating resin body varies in thickness as measured in the stacking direction; and
  the second elastic layer varies in thickness as measured in the stacking direction, the thickest part of the second elastic layer corresponding to the thinnest part of the second portion of the insulating resin body.

* * * * *